(12) United States Patent
Bharath et al.

(10) Patent No.: US 8,718,321 B2
(45) Date of Patent: May 6, 2014

(54) METHOD OF IMAGE PROCESSING

(75) Inventors: Anil Anthony Bharath, London (GB); Jeffrey Ng Sing Kwong, London (GB)

(73) Assignee: Cortexica Vision Systems Limited, London (GB)

( * ) Notice: Subject to any disclaimer, the term of this patent is extended or adjusted under 35 U.S.C. 154(b) by 629 days.

(21) Appl. No.: 12/377,490

(22) PCT Filed: Aug. 16, 2007

(86) PCT No.: PCT/EP2007/058547
§ 371 (c)(1),
(2), (4) Date: Jun. 12, 2009

(87) PCT Pub. No.: WO2008/020068
PCT Pub. Date: Feb. 21, 2008

(65) Prior Publication Data
US 2010/0226533 A1    Sep. 9, 2010

(30) Foreign Application Priority Data
Aug. 16, 2006 (GB) .................................. 0616293.7

(51) Int. Cl.
*G06K 9/00* (2006.01)
(52) U.S. Cl.
USPC ........... 382/103; 382/181; 382/190; 382/209; 348/135; 348/169
(58) Field of Classification Search
USPC .................. 382/103, 104, 190, 197, 209, 225; 348/135, 169
See application file for complete search history.

(56) References Cited

U.S. PATENT DOCUMENTS 5,233,670 A    8/1993    Dufour et al.
5,430,810 A    7/1995    Saeki
(Continued)

FOREIGN PATENT DOCUMENTS

EP    0 722 149 A1    7/1996
EP    0 762 326 A2    3/1997
(Continued)

OTHER PUBLICATIONS

Srinivasa, N. "Learning and Generlization of Noisy Mappings Using a Modified PROBART Neural Network" IEEE Transactions on Signal Processing, vol. 45, Oct. 1997, pp. 2533-2550.*

(Continued)

*Primary Examiner* — Matthew Bella
*Assistant Examiner* — Julian Brooks
(74) *Attorney, Agent, or Firm* — EIP US LLP

(57) ABSTRACT

The present invention relates to a method of identifying a target object in an image using image processing. It further relates to apparatus and computer software implementing the method. The method includes storing template data representing a template orientation field indicative of an orientation of each of a plurality of features of a template object; receiving image data representing the image; processing the image data to generate an image orientation field indicating an orientation corresponding to the plurality of image features; processing the image orientation field using the template orientation field to generate a match metric indicative of an extent of matching between at least part of the template orientation field and at least part of the image orientation field; and using the match metric to determine whether or not the target object has been identified in the image. Image and/or template confidence data is used to generate the match metric.

18 Claims, 10 Drawing Sheets

(56) References Cited

U.S. PATENT DOCUMENTS

| | | | |
|---|---|---|---|
| 5,825,915 | A | 10/1998 | Michimoto et al. |
| 6,173,066 | B1 | 1/2001 | Peurach et al. |
| 6,263,088 | B1* | 7/2001 | Crabtree et al. ............ 382/103 |
| 6,351,573 | B1 | 2/2002 | Schneider |
| 6,356,647 | B1 | 3/2002 | Bober et al. |
| 6,546,137 | B1 | 4/2003 | Lai et al. |
| 6,556,692 | B1 | 4/2003 | Gavrila |
| 6,591,004 | B1 | 7/2003 | VanEssen et al. |
| 6,594,378 | B1 | 7/2003 | Li et al. |
| 6,732,046 | B1 | 5/2004 | Joshi |
| 6,792,135 | B1 | 9/2004 | Toyama |
| 6,807,286 | B1 | 10/2004 | Krumm et al. |
| 6,829,370 | B1 | 12/2004 | Pavlidis et al. |
| 6,845,177 | B2 | 1/2005 | Chiu |
| 6,850,646 | B1 | 2/2005 | Silver et al. |
| 6,856,698 | B1 | 2/2005 | Silver et al. |
| 6,876,779 | B2 | 4/2005 | Rising, III |
| 6,975,334 | B1 | 12/2005 | Barrus |
| 6,985,620 | B2* | 1/2006 | Sawhney et al. ............ 382/154 |
| 7,016,532 | B2 | 3/2006 | Boncyk et al. |
| 7,027,619 | B2 | 4/2006 | Pavlidis et al. |
| 7,035,434 | B2 | 4/2006 | Estevez |
| 7,054,505 | B2 | 5/2006 | Shyu |
| 7,352,892 | B2 | 4/2008 | Zhang et al. |
| 7,444,002 | B2 | 10/2008 | Teku et al. |
| 7,486,812 | B2 | 2/2009 | Gurcan et al. |
| 7,986,820 | B2* | 7/2011 | Moghaddam ............... 382/124 |
| 2001/0055425 | A1 | 12/2001 | Chiu |
| 2002/0057838 | A1 | 5/2002 | Steger |
| 2003/0053664 | A1 | 3/2003 | Pavlidis et al. |
| 2003/0123713 | A1 | 7/2003 | Geng |
| 2003/0123736 | A1 | 7/2003 | Xu |
| 2003/0198398 | A1 | 10/2003 | Guan et al. |
| 2003/0235327 | A1 | 12/2003 | Srinivasa |
| 2004/0042661 | A1 | 3/2004 | Ulrich et al. |
| 2004/0119819 | A1 | 6/2004 | Aggarwal et al. |
| 2005/0074156 | A1 | 4/2005 | Holupka et al. |
| 2005/0105780 | A1* | 5/2005 | Ioffe ............................ 382/118 |
| 2005/0152588 | A1 | 7/2005 | Yoshida et al. |
| 2005/0169529 | A1* | 8/2005 | Owechko et al. ............ 382/190 |
| 2005/0169531 | A1 | 8/2005 | Fan |
| 2005/0213818 | A1 | 9/2005 | Suzuki et al. |
| 2005/0251347 | A1 | 11/2005 | Perona et al. |
| 2006/0093998 | A1 | 5/2006 | Vertegaal |

FOREIGN PATENT DOCUMENTS

| | | |
|---|---|---|
| EP | 1 017 019 A2 | 7/2000 |
| EP | 1 193 642 A1 | 4/2002 |
| EP | 1 394 727 A1 | 3/2004 |
| EP | 0 741 540 B1 | 4/2004 |
| EP | 1 058 909 B1 | 2/2005 |
| EP | 1 515 277 A1 | 3/2005 |
| EP | 1 301 896 B1 | 1/2006 |
| GB | 2 384 067 A | 7/2003 |
| JP | 03-201078 | 9/1991 |
| JP | 04-349583 | 12/1992 |
| JP | 11-351842 | 12/1999 |
| JP | 2004-279187 | 10/2004 |
| WO | 01/29770 A2 | 4/2001 |
| WO | 01/33497 A1 | 5/2001 |
| WO | 02/29712 A2 | 4/2002 |
| WO | 03/023695 A1 | 3/2003 |
| WO | 03/058496 A2 | 7/2003 |
| WO | 2004/038659 A2 | 5/2004 |
| WO | 2004/059573 A2 | 7/2004 |
| WO | 2004/084054 A2 | 9/2004 |
| WO | 2005/024708 A1 | 3/2005 |
| WO | 2005/074314 A1 | 8/2005 |
| WO | 2005/098751 A1 | 10/2005 |
| WO | 2006/036842 A2 | 4/2006 |

OTHER PUBLICATIONS

Artolazabal, J.A.R., et al., "3DSVHT: Extraction of 3D Linear Motion via Multi-view, Temporal Evidence Accumulation," ACIVS 2005, LNCS 3708, pp. 563-570, 2005.

Chen, Teh-Chuan, et al., "An Efficient Randomized Algorithm for Detecting Circles," Computer Vision and Image Understanding, vol. 83, 172-191 (2001).

Basalamah, Saleh, et al., "Contrast Marginalized Gradient Template Matching," ECCV 2004, LNCS 3023, pp. 417-429, 2004, (c) Springer-Verlag Berlin Heidelberg 2004.

Bharath, Anil Anthony, et al., "A Probabilistic Approach to Boundary Handling," Faculty of Engineering, Imperial College London, London SW7 2AZ, UK, published online at http://www.bg.ic.ac.uk/research/vision/papers/BharathNg%20-%20A%20Probabilistic%20Approach.pdf, 13th European Signal processing Conference Sep. 4-8, 2005.

Bharath, Anil Anthony, et al., "A Steerable Complex Wavelet Construction and Its Application to Image Denoising," IEEE Transactions on Image Processing, vol. 14, No. 7, Jul. 2005, pp. 948-959.

Chandrasekaran, V., et al., "Facial Feature Detection Using Compact Vector-Field Canonical Templates," Systems, Man and Cybernetics and Simulation, IEEE, vol. 3, Oct. 12, 1997, pp. 2022-2027, XP010249240 ISBN: 0-7803-4053-1.

Crouzil, Alain, et al., "A New Correlation Criterion Based on Gradient Fields Similarity," Proceedings of the International Conference on Pattern Recognition, IEEE, vol. 1, 1996, pp. 632-636, XP002419454.

Froba, Bernhard, et al., "Real-Time Face Detection Using Edge-Orientation Matching," AVBPA 2001, LNCS 2091, pp. 78-83, XP001077539, (c) Springer-Verlag Berlin Heidelberg 2001.

Kimura, Akio, et al., "An Extension of the Generalized Hough Transform to Realize Affine-Invariant Two-dimensional (2D) Shape Detection," Proceedings 16th International Conference on Pattern Recognition, vol. 4, pp. 65-69, 2002, IEEE.

Kimura, Akio, et al., "Generalized Hough Transform to Be Extended as an Affine-Invariant Detector of Arbitrary Shapes," Electronics and Communications in Japan, Part 2, vol. 87, No. 6, 2004, pp. 58-68.

Lappas, Pelopidas, et al., "Feature Tracking in an Energy Maximization Framework," Proceedings of the Second International Conference on Machine Learning and Cybernetics, Xi'an, 2003, pp. 3109-3114, vol. 5, IEEE Cat. No. 03EX693.

Scharstein, Daniel, "Matching Images by Comparing their Gradient Fields," IEEE, vol. 1, Oct. 9, 1994, pp. 572-575, XP000515226, ISBN: 0-8186-6267-0.

Tian, Qi-Chuan, et al., "Fast Algorithm and Application of Hough Transform in Iris Segmentation," Proceedings of the Third International Conference on Machine Learning and Cybernetics, Shanghai, Aug. 26-29, 2004, 0-7803-8403-2/04, (c) 2004, IEEE Cat. No. 04EX826), pp. 3977-3980, vol. 7.

Yabuta, Yoshito, et al., "Binocular robot vision system with autonomous movement of viewpoint," Proc. of SPIE Int. Sco. Opt. Eng., vol. 5302, (c) 2004, pp. 61-68.

Yager, Neil, et al., "Coarse Fingerprint Registration Using Orientation Fields," EURASIP Journal on Applied Signal Processing 2005:13, 2043-2053, (c) 2005 Hindawi Publishing Corporation, XP-002455428.

Zheshen, Wang, et al., "Building Detection and Recognition Via The Improved Hough Transform," Proc. Int. Comput. Congr. Wavelet Anal. Appl. Act. Media Technol., vol. 2, 2004, pp. 1075-1080.

* cited by examiner

METHOD OF IMAGE PROCESSING

FIELD OF THE INVENTION

The present invention relates to a method of identifying a target object in an image using image processing. It further relates to apparatus and computer software implementing the method.

BACKGROUND OF THE INVENTION

Amongst the most generic of techniques for the detection of planar projections of shapes in digital images are the so-called template-matching methods, where a learned image template is compared (matched) against all possible locations in the image. Simple template matching methods operate on luminance values of the template and image and compute a distance metric based on normalised cross-correlation. Normalised cross-correlation is invariant to global and linear illumination changes but not to local non-homogenous changes. It is also not invariant to intra-class variations of a family of objects such as relative luminance values between different regions of the object.

An important issue is that of the property used to match between image and template. The most widely used techniques make use of the image pixel values themselves, and use cross-correlation between a template containing the image pixel values from one or more averaged examples of the shape.

Template matching between binary edge maps of the image and shape has led to faster, and more selective discrimination of shapes than that using simply the pixel values.

European patent application no. EP 1193642 A1 describes a method for recognising a user defined model object within an image. The model object is searched for in an image by generating a match metric using a normalised cross-correlation technique.

It is an object of the invention to provide improved object detection in image processing techniques.

SUMMARY OF THE INVENTION

In accordance with one aspect of the present invention, there is provided a method of identifying a target object in an image including a plurality of image features, wherein said method includes:

a) storing template data, said template data representing a template orientation field indicative of an orientation of each of a plurality of features of a template object;

b) receiving image data representing said image;

c) processing said image data to generate an image orientation field indicating an orientation corresponding to said plurality of image features;

d) processing said image data to generate image confidence data based on at least one characteristic for use in identifying said target object in a given image, said characteristic being indicative of an increased likelihood that at least one part of said given image represents at least part of said target object, relative to other parts of said given image;

e) processing said image orientation field using said template orientation field and said image confidence data to generate a match metric indicative of an extent of matching between at least part of said template orientation field and at least part of said image orientation field; and f) using said match metric to determine whether or not said target object has been identified in said image.

The method of the present invention allows a target object to be identified in images, whether still images or video images, both quickly and efficiently.

Use of image confidence data allows the target object to be identified with greater certainty, and thus with more accuracy. The image confidence data may be based on one or more characteristics related to the target object so that matching data of a higher quality may be generated.

In accordance with a further aspect of the present invention there is provided a method of identifying a target object in an image including a plurality of image features, wherein said method includes:

a) storing template data, said template data representing a template orientation field indicative of an orientation of each of a plurality of features of a template object;

b) receiving template confidence data indicating a likelihood that at least one part of said template accurately represents at least part of said target object;

c) receiving image data representing said image;

d) processing said image data to generate an image orientation field indicating an orientation corresponding to said plurality of image features;

e) processing said image orientation field using said template orientation field and said template confidence data to generate a match metric indicative of an extent of matching between at least part of said template orientation field and at least part of said image orientation field; and f) using said match metric to determine whether or not said target object has been identified in said image.

The template confidence data is based on known parameters related to the target object and/or other features of the image. The template confidence data is used to improve a quality of matching with the template data such that the target object may be more accurately and reliably identified in the image.

In accordance with yet further aspects of the present invention, there is provided apparatus arranged to perform the method of the present invention, computer software arranged to perform the method of the present invention and a data carrier storing the computer software of the present invention.

Further features and advantages of the invention will become apparent from the following description of preferred embodiments of the invention, given by way of example only, which is made with reference to the accompanying drawings.

DETAILED DESCRIPTION OF THE INVENTION

The present invention provides a method of identifying a target object in an image. In embodiments of the invention to be described, the target object is a human face, however, it is envisaged that the target object may be an alternative object.

Image Processing Apparatus

In the embodiments of the method of the invention to be described, the method is performed by computer software which the image processing apparatus is arranged to run. The computer software may be stored on a suitable data carrier such as a compact disc (CD).

Figure 1:
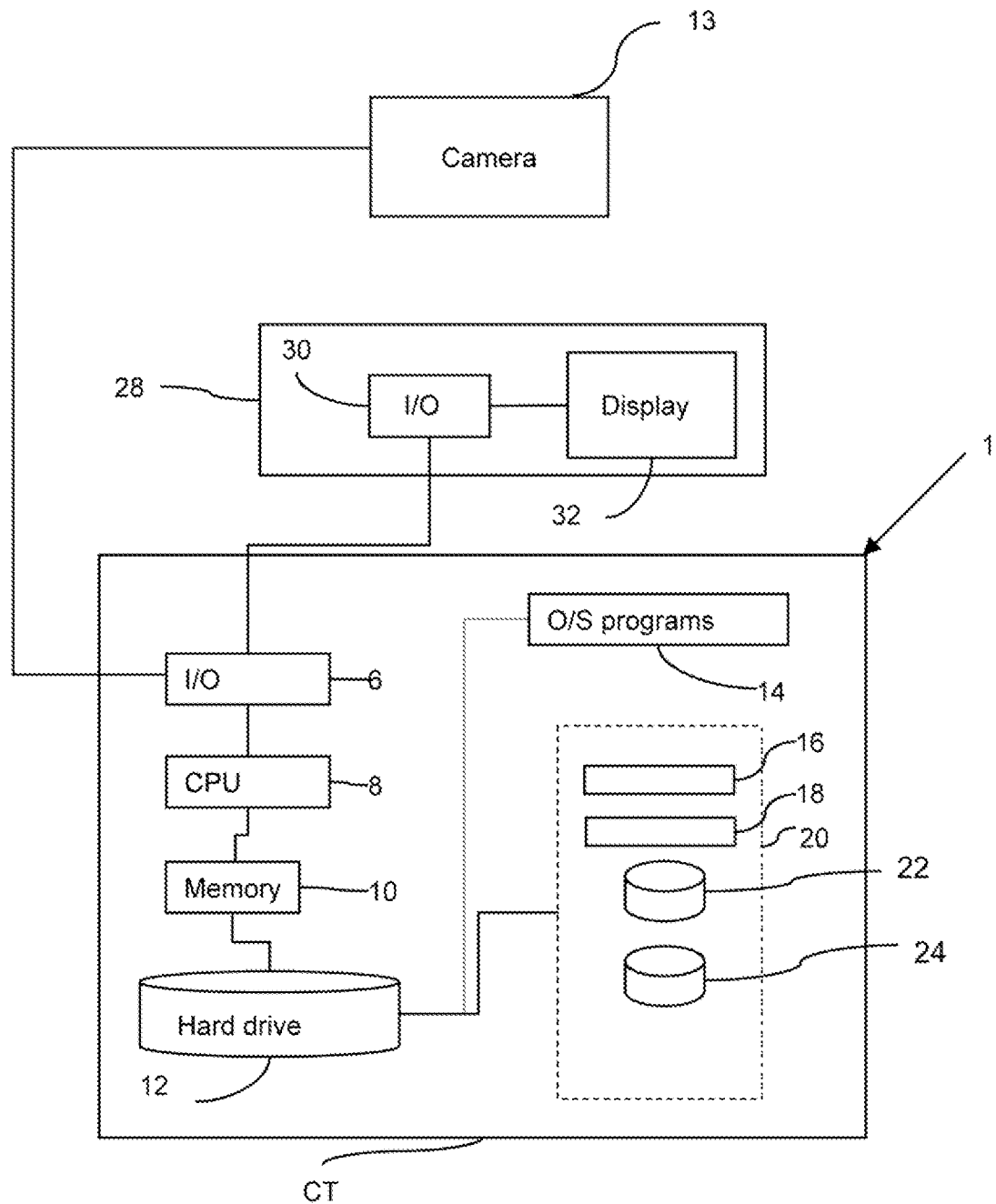
FIG. 1 shows schematically apparatus for performing the method of the present invention.

FIG. 1 shows schematically apparatus 1 arranged to perform the method of the invention. The apparatus 1 includes a computer terminal CT which includes a central processing unit (CPU) 8, memory 10, a data storage device such as a hard disc drive 12 and I/O devices 6 which facilitate interconnection of the computer CT with an optional image capture device such as a camera 13 arranged to record image data in accordance with the present invention. Alternatively, the CT may be arranged to receive image data from a remote image data source such as an image database.

The I/O devices 6 further facilitate interconnection of a display element 32 of a screen 28 via a screen I/O device 30. Operating system programs 14 are stored on the hard disc drive 12 and control, in a known manner, low level operation of the computer terminal CT. Program files and data 20 are also stored on the hard disc drive 12, and control, in a known manner, outputs to an operator via associated devices and output data stored on the hard disc drive 12. The associated devices include the display 32 as an element of the screen 28, a pointing device (not shown) and keyboard (not shown), which receive input from, and output information to, the operator via further I/O devices (not shown). Included in the program files 20 stored on the hard drive 12 is a database 22 for storing image data and data related to the image data, including data related to the characteristics described further below, and a database 24 for storing data related to the template data, including the template data.

Method of Identifying a Target Object in an Image

An overview of methods according to embodiments of the invention will first be given, with reference to FIG. 2 which is a flow diagram indicating steps of the method of the invention. This will be followed by a description of steps of the method in greater detail, with respect to different embodiments of the method.

Figure 2:
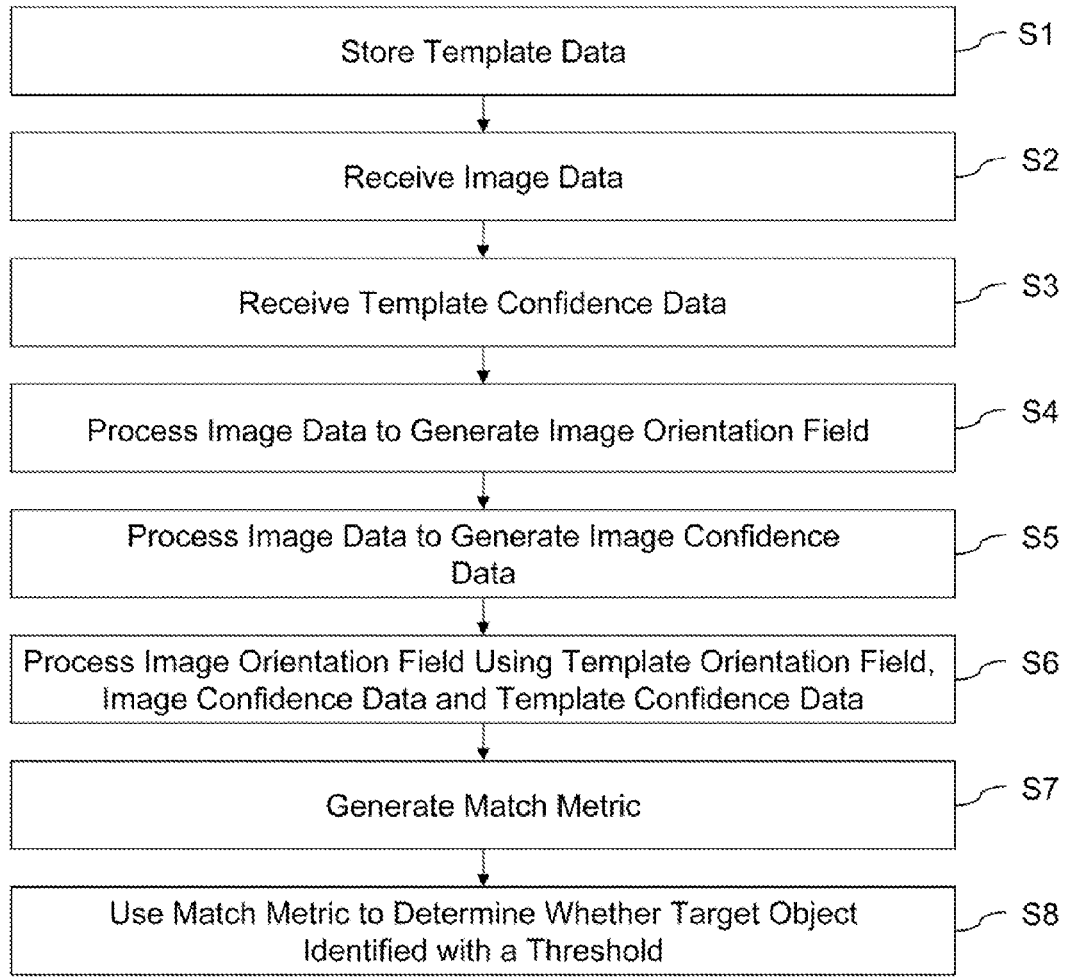
FIG. 2 shows a flow diagram giving an overview of the method of the present invention.

With reference to FIG. 2, template data is stored, in step S1, in the template data store 24. The template data represents a template orientation field indicative of an orientation of each of a plurality of features of a template object. Further details of the template data will be described later.

Next, image data is received, in step S2. The image data may be recorded by the camera 13, or may have been received from a remote image data source. The image data represents a digital image which includes a plurality of image features. The image data may represent a coloured image or a greyscale image.

Each of the image features represents, in the image, a boundary which separates a region of higher light intensity from a region of lower light intensity. Each boundary corresponds with an edge or, in some embodiments, a line in the image. For the example where the image includes a human face, a boundary may define an edge which separates the face from an image background. In embodiments of the invention to be described, the boundary may also separate two regions from each other, these two regions each having a similar light intensity, with the boundary being a line of different intensity from these two regions. For example, the boundary may define a structural line of a human face.

Template confidence data is received, in step S3, which indicates a likelihood that at least one part of the template represents at least part of the target object. In parts of the template where correspondence with the template orientation field is not highly indicative of a target object, the template confidence data is relatively low. In parts of the template where correspondence with the template orientation field is highly indicative of a target object, the template confidence data is relatively high.

In step S4, the image data is processed to generate an image orientation field which indicates an orientation of each of the plurality of image features.

Next, the image data is processed, in step S5, to generate image confidence data which is based on at least one characteristic for use in identifying the target object in a given image. Further details of the characteristic, or characteristics, involved will be explained later.

In step S6, the image orientation field is processed using the template orientation field, the image confidence data and the template confidence data to generate, in step S7, a match metric which is indicative of an extent of matching between at least part of the template orientation field and at least part of the modified image orientation field.

In step S8, the match metric is used to determine whether or not the target object has been identified in the image.

At least one of the image data, template data, image confidence data and template confidence data is arranged according to a matrix format.

In the description below, a divisive nomalisation function is used. Divisive normalisation is a refinement of local contrast normalisation. Rather than normalising image pixels by local image contrast or brightness over a neighbourhood of pixels, image gradient values are normalised by the sum of their own squared values on a pixel-by-pixel basis.

Template Data

The template object, which is represented by the template orientation field of the template data, corresponds with the target object to be identified in the image. In the embodiments to be described, the target object is a human face but it should be appreciated that other target objects may be desired, such as an animal or a vehicle, for example a car. The template object has a plurality of features having similar properties to the image features. The template orientation field comprises a field of orientation vectors, arranged in this embodiment in a matrix format, which may have a rectangular grid form.

Figure 3:
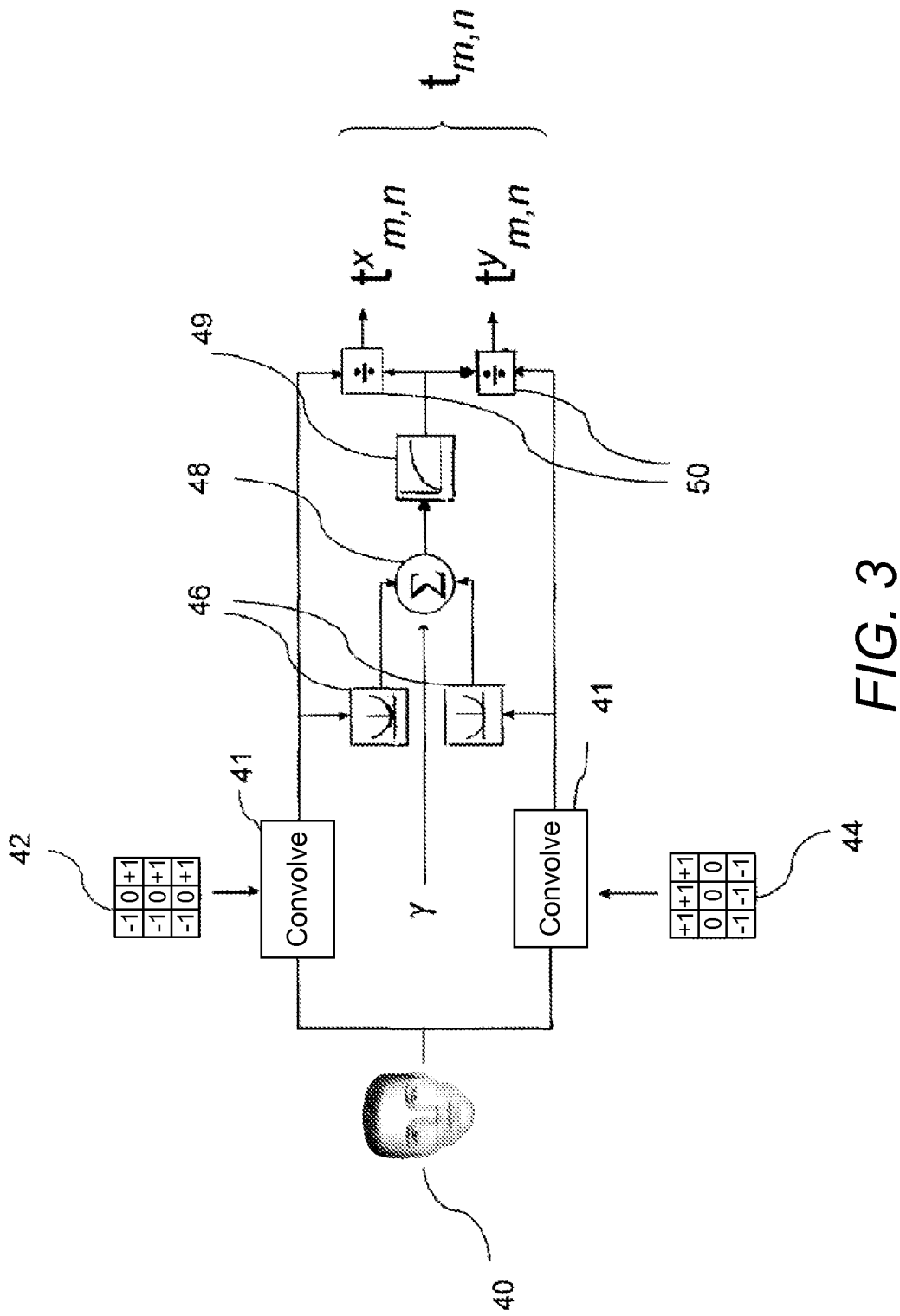
FIG. 3 shows schematically a method of generating a template orientation field, in accordance with an embodiment of the present invention.

FIG. 3 shows schematically a method of generating the template orientation field in accordance with an embodiment of the present invention. Training image data representing a training image 40 is input data for use in generating the template orientation field. The template data has similar properties to the image data. The training image data is convolved, using a suitable convolution function 41 for example, a convolution function $C_{k,l}$ calculated in accordance with equation 1:

$$C_{k,l} = \sum_m \sum_n A_{m,n} \cdot B_{k+m,l+n} \qquad (1)$$

where $A_{m,n}$ and $B_{k,l}$ are exemplary masks for convolving, and the convolution produces results for all values of k and l.

In the present embodiment, each of at least one x axis gradient mask 42 and at least one y axis gradient mask 44 are convolved with the training image data. Such a gradient mask may alternatively be referred to as an image boundary filter. The x axis gradient mask(s) 42 and the y axis gradient mask(s) 44 may be applied either in parallel or sequentially to the training image data. The training image 40 is, in this embodiment, a mean image of a plurality of human face images. In this way, the template data, and consequently the template object, corresponds with the mean human face image.

Data of the at least one x axis gradient mask 42 and the at least one y axis gradient mask 44 is arranged according to a matrix format. The gradient mask(s) 42, 44 correspond with different possible boundary edges which may be identified in the image, in the x axis or y axis direction, appropriately.

Where a plurality of different x axis gradient masks 42 are applied to the training image data, each x gradient mask 44 may correspond with a different pattern of higher and lower light intensity regions which are separated by a boundary running at least partly in the x axis direction.

Similarly, where a plurality of different y axis gradient masks 44 are applied to the training image data, each y gradient mask 44 may correspond with a different pattern of higher and lower light intensity regions, separated by a boundary running at least partly in the y axis direction.

Application of the x axis and y axis gradient masks 42, 44 yields gradient direction vectors for x axis and y axis features, respectively. These gradient direction vectors are converted into orientation vectors by wrapping their angles to the range from $-\pi/2$ to $\pi/2$. Alternatively, a double angle representation may be used to increase the selectivity in generating the orientation vectors.

The output of each of these two convolutions comprises a plurality of orientation vectors corresponding with a plurality of features of the training image along the x axis and the y axis, accordingly, which are similar to the image features. These convolution outputs are each squared, using a squaring function 46, and then summed together, using a summation function 48, with a tunable constant parameter $\gamma$, the value of which is determined in accordance with an amount of image noise identified in the image data. The parameter may preferably be set at a value of less than 25%, for example 10% of the maximum gradient of the image data.

A square root function 49 is applied to the output of the summation function 48, and the result of the summation function 48 is used to divisively normalise, using a divisive normalisation function 50, the output data of each of the convolution functions 41, to produce an x axis template orientation field component $t^{x}_{m,n}$ and a y axis template orientation field component $t^{y}_{m,n}$. The length of each vector, which may otherwise be referred to as the gradient intensity, in the appropriate template orientation field component is thus normalised by the sum of itself and the parameter $\gamma$. The two template orientation field components together form a template orientation field $t_{m,n}$ where m and n are template coordinates referring to values of a vector matrix of the template data. These coordinates may be defined with the origin at the centre of the template orientation field.

Figure 4:
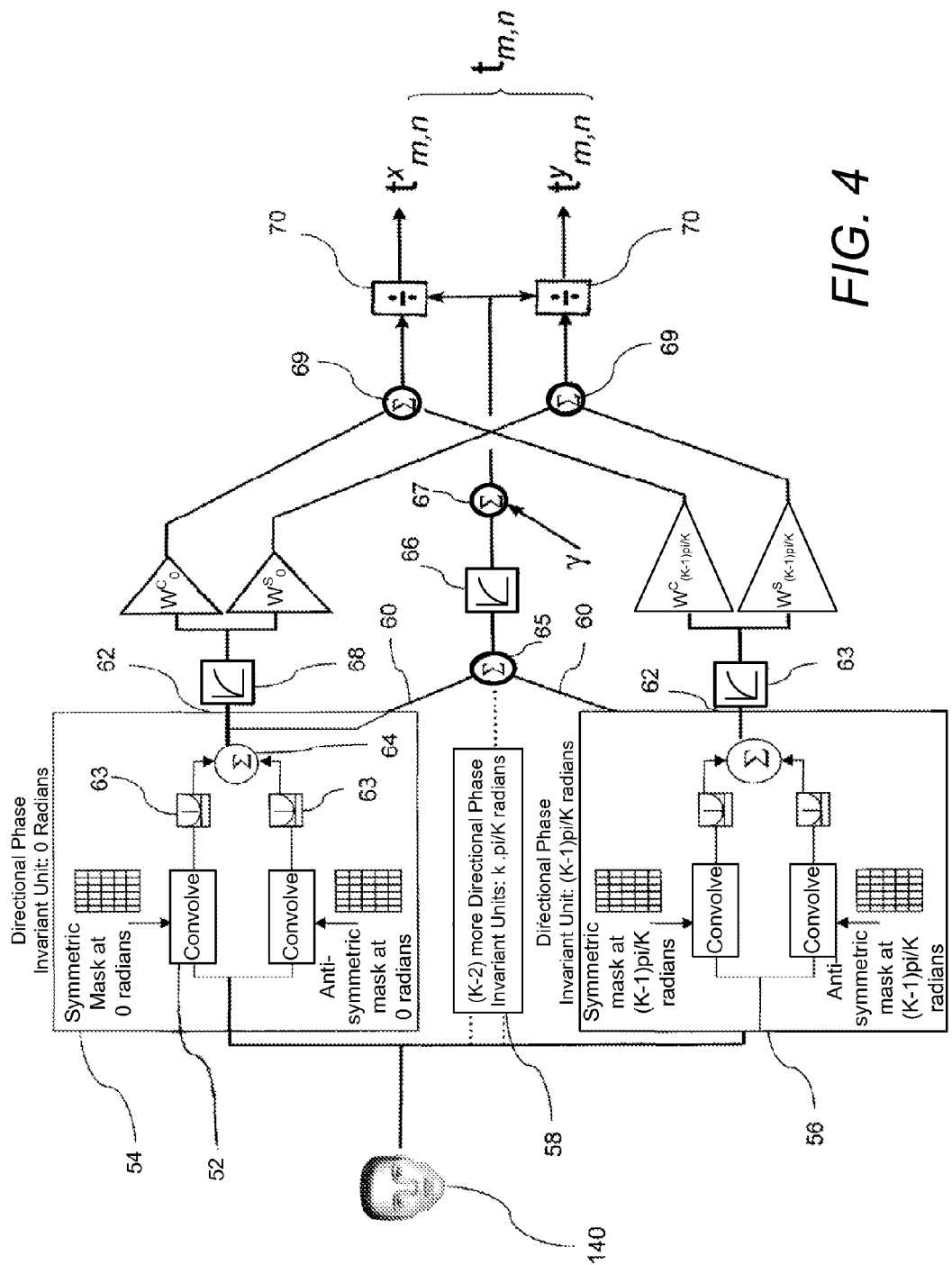
FIG. 4 shows schematically a method of generating a template orientation field, in accordance with a different embodiment of the present invention.

FIG. 4 shows schematically an alternative method of generating the template orientation field using a steerable quadrature filter, in accordance with a different embodiment of the present invention. Features of this alternative method are similar to the method described previously using FIG. 3, and such features will be referred to using the same reference numerals, incremented by 100; corresponding descriptions should be taken to apply also.

Figure 5A:
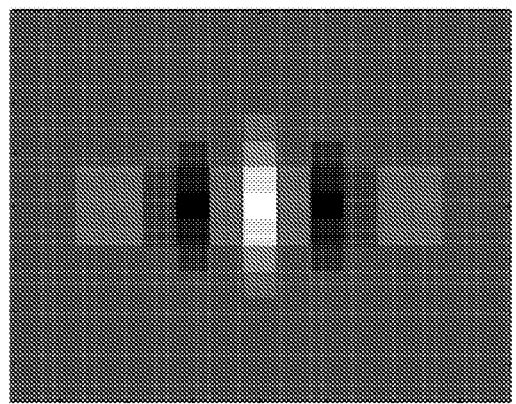
FIGS. 5a and 5b show exemplary masks in accordance with an embodiment of the present invention.
Figure 5B:
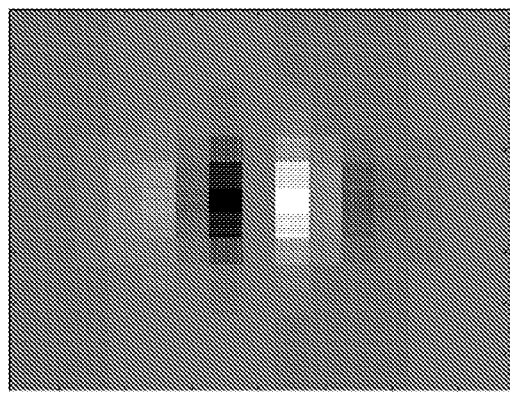

The training image data representing the training image 140 is convolved, using a convolution function 52, separately with each of a pair of masks consisting of a symmetric mask and an antisymmetric mask. The symmetric mask responds most strongly to local image structure that is exactly symmetric about an axis that is aligned with the mask direction of the boundary, and has overlapping spatial frequency support, in magnitude, to that of the mask. The associated antisymmetric mask responds most strongly to local image structure that is exactly antisymmetric about an axis aligned with the mask direction of the boundary and has overlapping spatial frequency content, in magnitude, to that of the mask. The masks are used in pairs and an exemplary 0 radian and vertically oriented symmetric mask and antisymmetric mask is shown, respectively, in FIGS. 5a and 5b. Further details may be found in "A Steerable Complex Wavelet Construction and Its Application to Image Denoising", A. Bharath and J. Ng, IEEE Transactions on Image Processing. 14(7):948-959. July 2005, the contents of which are included herein by reference.

The output of each of these convolutions is wrapped by using an intermediate double angle representation. The output of each convolution is then squared, using the square function 63, and summed together using the summation function 64. The steps of generating the template orientation field described so far, using FIG. 4, are performed with respect to one of a total number K of direction channels. Each direction channel provides phase-invariant information concerning identification of boundaries between different light intensity regions of the training image, corresponding with the features of the training image. Each direction channel corresponds to a directional phase invariant unit. As illustrated in FIG. 4, a first directional channel 54 corresponds with 0 radians, a second directional channel 56 corresponds with $(K-1)\pi/K$ radians and a further number of K−2 directional channels 58 may be utilised, indicated by dashed lines, which correspond with the formula $k\pi/K$ radians, where k refers to a certain one of K−2 further directional channels.

Each direction channel can provide phase-invariant information concerning the boundaries present in the training image 140 and the plurality of direction channels together encode the direction of local energy in the training image 140. More channels provide a better ability to distinguish between shape boundaries of the training image 140 that have sharp curvatures.

The output from each direction channel is fed through a first 60 and a second 62 path. Following the first path 60, the output of the direction channel is unchanged and is summed with the unchanged output of each of the other direction channels, using the summation function 65. The output of this summation is fed through the square root function 66 and then added to the constant $\gamma$, which was described earlier in further detail, using a further summation function 67. This summed result is used for divisive normalisation upon the x and y axis processing channels as described below.

Following the second path 62, the output of each direction channel is fed through the square-root function 68, and then is split into an x axis channel and a y axis channel. The total number K of x axis channels are weighted with a gain function $W_k^C$, as calculated in accordance with equation 2, with k taking integer values from 1 up to K.

$$W_k^C = \cos(2\pi(k-1)/K) \qquad (2)$$

Similarly, the total number of K of y-channels are weighted with a gain function $W_k^S$, as calculated in accordance with equation 3, with k taking integer values from 1 up to K.

$$W_k^S = \sin(2\pi(k-1)/K) \quad (3)$$

The weighted x channels are summed, using the summation function 69 and divisively normalised with the output of the first path 60 following summation with the constant γ using the divisive normalising function 70. In this way the length of each vector, otherwise referred to as the steered energy of the template data, is normalised by the sum of the energy of each basis filter at that position in the template and the tunable parameter γ to yield the x axis template orientation field component $t^x_{m,n}$. For the divisive normalisation function, the output of each directional unit is modified by dividing it by the square root of the sum of the squared magnitude outputs at each location in the image. The purpose of this is that each feature measurement used for subsequent detection is normalised by other feature measures that share similar properties.

The weighted y channels are summed, using the summation function 69 and divisively normalised with the output of the first path 60 following summation with the constant γ using the divisive normalising function 70. Similarly, in this way the length of each vector is normalised by the sum of the energy of each basis filter at that position in the template and the tunable parameter γ to yield the y axis template orientation field component $t^y_{m,n}$.

The x axis template orientation field component $t^x_{m,n}$ and the y axis template orientation field component $t^y_{m,n}$ in combination form the template orientation field $t_{m,n}$.

Figure 5C:
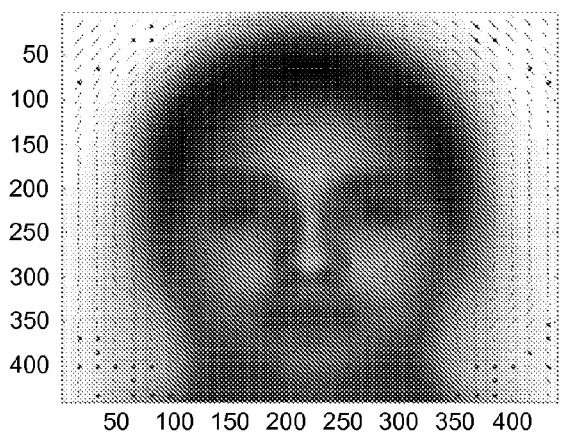
FIGS. 5c, 5d, 5e show exemplary orientation fields in accordance with the invention.
Figure 5D:
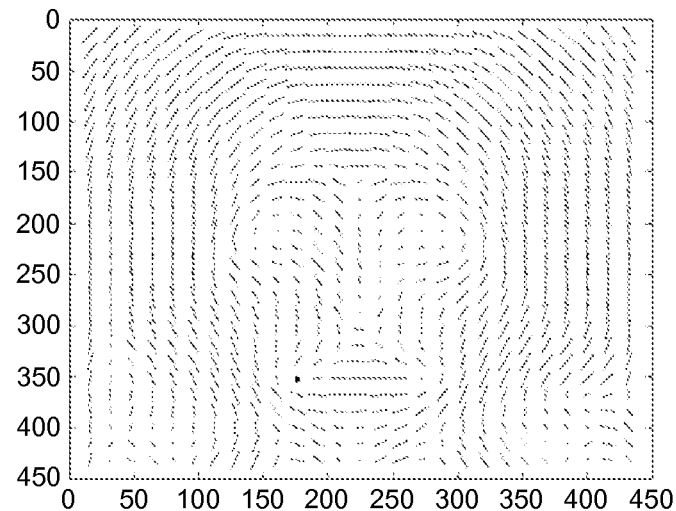
Figure 5E:
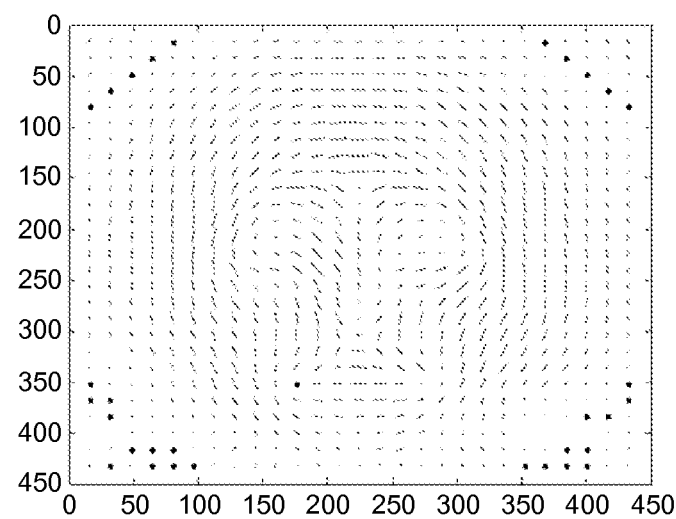

In accordance with this embodiment, FIG. 5c shows an exemplary template orientation field applied over a training image of a mean human face. FIG. 5d shows the same as FIG. 5c, but without the training image. FIG. 5e shows an exemplary template orientation field with a cosine weighting from the centre of the field.

Template Confidence Data

The template orientation field will be affected by both the representation of the target object in the training image data and the background near the boundary of the target object in the training image. The template object corresponds to the target object. The effect of background clutter in the template orientation field may be controlled.

The template confidence data indicates parts of the template data which have a greater likelihood of representing the template object than other parts of the template data. The template confidence data may indicate a known parameter of the template object such as the size of the template object which may, for example, correspond to an expected extent of a human face (for example, a radial extent). In this way the template confidence data indicates a reliability of each vector in the template orientation field, for example due to background clutter, using a measure proportional to the distance between the position of the vector and the boundary of the template object. Such a measure may, alternatively, be taken between the vector position and any particular location of the template, such as the centre point. Further known parameters relating to the template object may also be used to generate the template confidence data.

Template Phase Map

Figure 6:
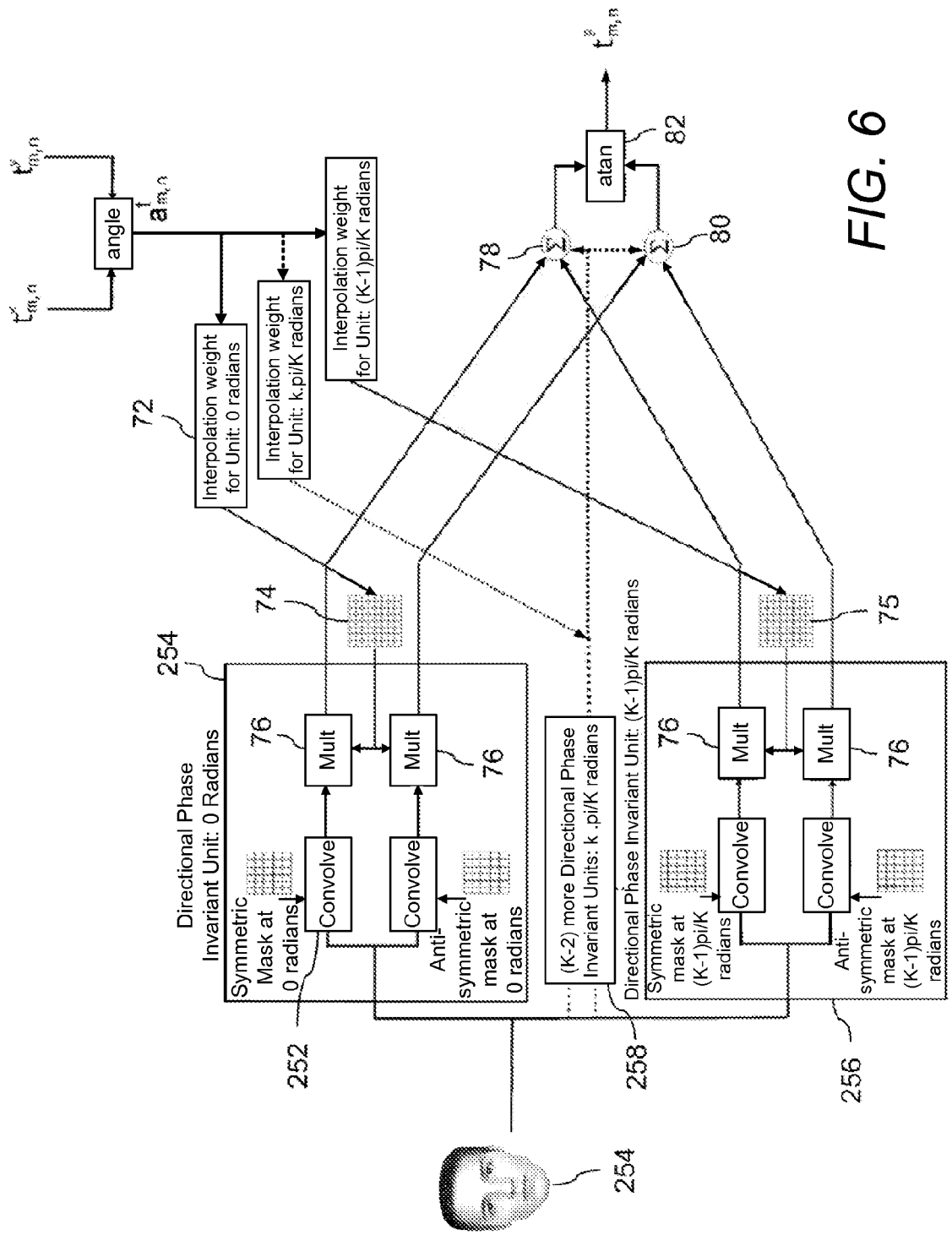
FIG. 6 shows schematically a method of generating a template phase map in accordance with an embodiment of the present invention.

In accordance with an embodiment of the invention, FIG. 6 shows schematically a method of generating template phase data, namely a template phase map $t^p_{m,n}$, indicative of a phase of at least one of the plurality of features of the template data. The template phase map $t^p_{m,n}$ includes a plurality of template phase values, each value corresponding with one of the plurality of features of the template data, each feature having certain template coordinate m,n values. The values of the template phase map $t^p_{m,n}$ are arranged in this embodiment in a matrix format.

Generation of the template phase map $t^p_{m,n}$ according to a steerable quadrature filter method will now be described with reference to FIG. 6. Some features and method steps described using FIG. 6 are similar to those described previously with reference to FIG. 4; corresponding reference numerals will be used, incremented by 200, and corresponding descriptions should be taken to apply here also.

Training image data, for example the training image 240, is convolved using the convolution function 252, separately for each of the pair of symmetric and antisymmetric masks, as described previously. Such convolutions are performed for each of the directional channels.

To generate the template phase map $t^p_{m,n}$, the x axis template orientation field component $t^x_{m,n}$ and the y axis template orientation field component $t^y_{m,n}$ which correspond with one feature of the training image 240 are used to determine template angle data, namely a template angle $a^t_{m,n}$, of the one feature. A template angle $a^t_{m,n}$ is similarly determined for at least one, preferably each, of the plurality of features to generate, for example, a template angle matrix of the template angle $a^t_{m,n}$ values.

Using an interpolation weight function 72, the magnitude of each template angle $a^t_{m,n}$ value is used to determine a magnitude of weighting applied to the corresponding feature of the result of the convolution by the symmetric and antisymmetric masks at the template coordinates m,n for each directional channel. Thus, the interpolation weight function 72 weights the value of each feature of the convolution outputs of each directional channel in accordance with the magnitude of the corresponding template angle $a^t_{m,n}$. For the directional channel with directional phase invariant unit of 0 radians, this results in a matrix of weight values, represented schematically in FIG. 6 as a grid 74.

A matrix of weight values is generated for each directional channel. For example, for the directional channel 256 having the directional phase invariant unit $(K-1)pi/K$ radians, a matrix 75 of weight values is generated. A weight matrix is similarly generated for the further directional channels 258, as indicated in FIG. 6 using dashed lines.

For the directional channel having a directional phase invariant unit of 0 radians, the training image 240 convolved with the symmetric mask is multiplied element-wise by the matrix 74 of weight values using a multiplication function 76. The multiplication function 76 is an element-wise multiplication of two data arrays. Similarly, for the other directional channels, including the directional channel with directional phase invariant unit $(K-1)pi/K$ radians, the training image 240 convolved with the symmetric mask is multiplied 76 with the matrix of weight values generated using the angle $a^t_{m,n}$.

For each directional channel, the training image 240 convolved with the anti-symmetric mask is multiplied 76 with the corresponding matrix of weight values generated using the appropriate interpolation weighting function.

For each directional channel, the output of each multiplication function 76 using the symmetric masks is summed using summation function 78 to provide a symmetric filter output. Similarly, the output of each multiplication function 76 corresponding with the antisymmetric masks is summed using summation function 80, to provide an antisymmetric filter output.

The ratio of the antisymmetric filter output to the symmetric filter output is determined, and an arctangent function 82 is applied to the ratio to generate the template phase map $t^p_{m,n}$.

Thus, the template phase map $t^p_{m,n}$ represents the symmetry of the responses for each feature of the template data in a direction perpendicular to that provided by the orientation fields.

Image Orientation Field

The methods of generating the template orientation field described previously using FIG. 3 or FIG. 4 may be used to generate the image orientation field from the image data. Instead, however, for generating the image orientation field, the input data should be the received image data instead of the training image data. Consequently, the output of either of the methods described using FIG. 3 or FIG. 4 is an x axis image orientation field component $i^x_{k,l}$ and a y axis image orientation field component $i^y_{k,l}$ where k and l are image coordinates referring to vector values of the matrix of the image data. Together, these two generated image orientation field components form an image orientation field $i_{k,l}$.

Image Confidence Data

The generated image confidence data may be based on a plurality of different characteristics. Each characteristic is indicative of an increased likelihood that at least one part of a given image, in this example namely the image represented by the received image data, represents at least part of the target object, relative to other parts of the given image.

Generation of image confidence data in accordance with a different characteristic will now be described for different embodiments. In further embodiments, image confidence data may alternatively be used which is generated in accordance with more than one of the different characteristics described below.

i. Image Error Characteristic

In an embodiment of the present invention, the characteristic indicated by the image confidence data relates to an extent of image errors expected in the image data and the method includes using the image confidence data to generate the match metric in accordance with the expected extent of image data errors.

The image data may include data errors including, for example, errors incurred during transmission of the image data to the CT of the apparatus 1 and errors incurred when recording the image data due to, for example, use of a poor quality camera or dust particles lying on a lens of the camera 13 which thus prevents recording of a true image.

In an embodiment of the invention, error characteristic data indicating an extent of expected image errors is received by the apparatus 1. The error characteristic data may include data of the quality of the camera and/or statistical data of a proportion of image data which is successfully received when transmitted over a given transmission means, such as a computer network. Further, image error corrections algorithms or image denoising algorithms may be used to generate the image confidence data.

By using the error characteristic data to generate image confidence data, this image confidence data may be used to successfully identify the target object from the image data where identification of the target object from the image orientation field without using image confidence data would have been unsuccessful.

ii. Image Occlusion Characteristic

In an alternative embodiment of the present invention, the characteristic indicated by the image confidence data relates to a possible occlusion of part of the target object in the image and the method includes using the image confidence data to generate the match metric in accordance with the possible occlusion.

Where the image includes an image of the target object, it is possible that part of the target object may be occluded by other objects in the image, such that image data only represents part of the target object.

In one embodiment of the invention, image occlusion characteristic data is received by the apparatus 1. The image occlusion characteristic data may represent a plurality of possible forms of an occlusion of the target object in an image, for example a shape occluding horizontally and/or vertically a middle part of the target object or a shape occluding horizontally and/or vertically a top, bottom and/or side part of the target object in the image. Further, if details of the type of objects present in the image scene recorded in the image are known, data may be available of shapes of objects commonly found in such a scene which may occlude the target object.

Additionally, the image occlusion characteristic data may include data of a percentage of an area of the object in the image which may be occluded whilst still allowing the target object to be successfully identified in the image using the template data.

iii. Object Motion Characteristic

In a further alternative embodiment of the present invention, the image data is video data and the characteristic relates to a possible movement of the target object. The method of the invention may include identifying a movement of the target object in the image using, for example, an image background subtraction algorithm or using data relating to a learned image background.

Movement of the target represented by the video image data may cause the shape of the target object represented by the video image data to change. The identified movement of the target object is used to determine a modified shape of the target object which is modified from a shape of the target object represented by the template data.

Without using the image confidence data based on the object motion characteristic, such movement, which consequently changes the shape of the target object to a different shape from that of the template object, would prevent successful identification of the target object in the video image data. Use of the image confidence data based on the object motion characteristic therefore allows the target object to be successfully identified in video image data.

iv. Object Colour Characteristic

In another alternative embodiment of the present invention, the image data represents the image in colour, such that the image data includes image colour data, and the characteristic relates to at least one colour indicative of the target object. In this example the characteristic relates to a colour indicative of human skin.

In the method of the invention, object colour characteristic data indicating at least one colour of human skin is received and is applied to the image data to generate the image confidence data. Parts of the image data which indicate parts of the image having a human skin colour are thus identified.

Processing the image confidence data based on the colour characteristic with the image orientation field allows parts of the image data to be identified which have a greater likelihood to represent the target object than other parts of the image data. In this way, parts of the image data are assigned a higher certainty of being representative of the target object than other parts of the image data.

Image Phase Map

The method of generating the template phase map $t^p_{m,n}$ described previously using FIG. 6 may be used to generate image phase data, namely an image phase map $i^p_{k,l}$ using the image data. The image phase data is indicative of a phase of at least one of the plurality of image features. For generating the image phase map $i^p_{m,n}$, the received image data is used instead of the training image data. Further, instead of inputting the template orientation field components $t^x_{m,n}$, $t^y_{m,n}$ for the x and y axes, the image orientation field components $i^x_{k,l}$, $i^y_{k,l}$ for the x and y axes are inputted. Further, the template angles $a^t_{m,n}$ are not determined; image angle data, namely image angles $a^i_{k,l}$, corresponding with at least one of the plurality of image features is determined instead.

Generation of Match Metric

As described previously, a match metric is generated by processing the image orientation field using the template orientation field, the image confidence data and the template confidence data.

Matching between template data and image data may be generalised to matching between template and image vector fields, which are normalised by combinations of non-linear functions of the outputs of linear spatial operators at each pixel.

The matching may be performed using banks of cross-correlators that operate in parallel upon the normalised orientation field components. This has significance for speed and ease of implementation on a variety of hardware and software platforms. The outputs of such correlators are generally mapped through non-linear functions, then weighted and combined to create accumulator spaces. The accumulator spaces are similar in spirit to those of Hough Transform techniques, but are more selective to the specific shapes of the training. Detection therefore relies on thresholding or detecting local maxima in the accumulator spaces.

In the embodiments to be described, at least one of the image confidence data and the template confidence data described previously is used. The image confidence data $CI_{m,n}$ includes x axis image confidence data $CI^x_{k,l}$ and y axis image confidence data $CI^y_{m,n}$. The template confidence data $CT_{m,n}$ includes x axis template confidence data $CT^x_{m,n}$ and y axis template confidence data $CT^y_{m,n}$. The x axis and y axis image confidence data and the x and y axis template confidence data is arranged according to a matrix format, where, in this example, each value of the confidence data matrix represents a likelihood that a part of the image represents the target object or a likelihood that a part of the template represents the template object, appropriately. Each matrix element is a vector.

Figure 7:
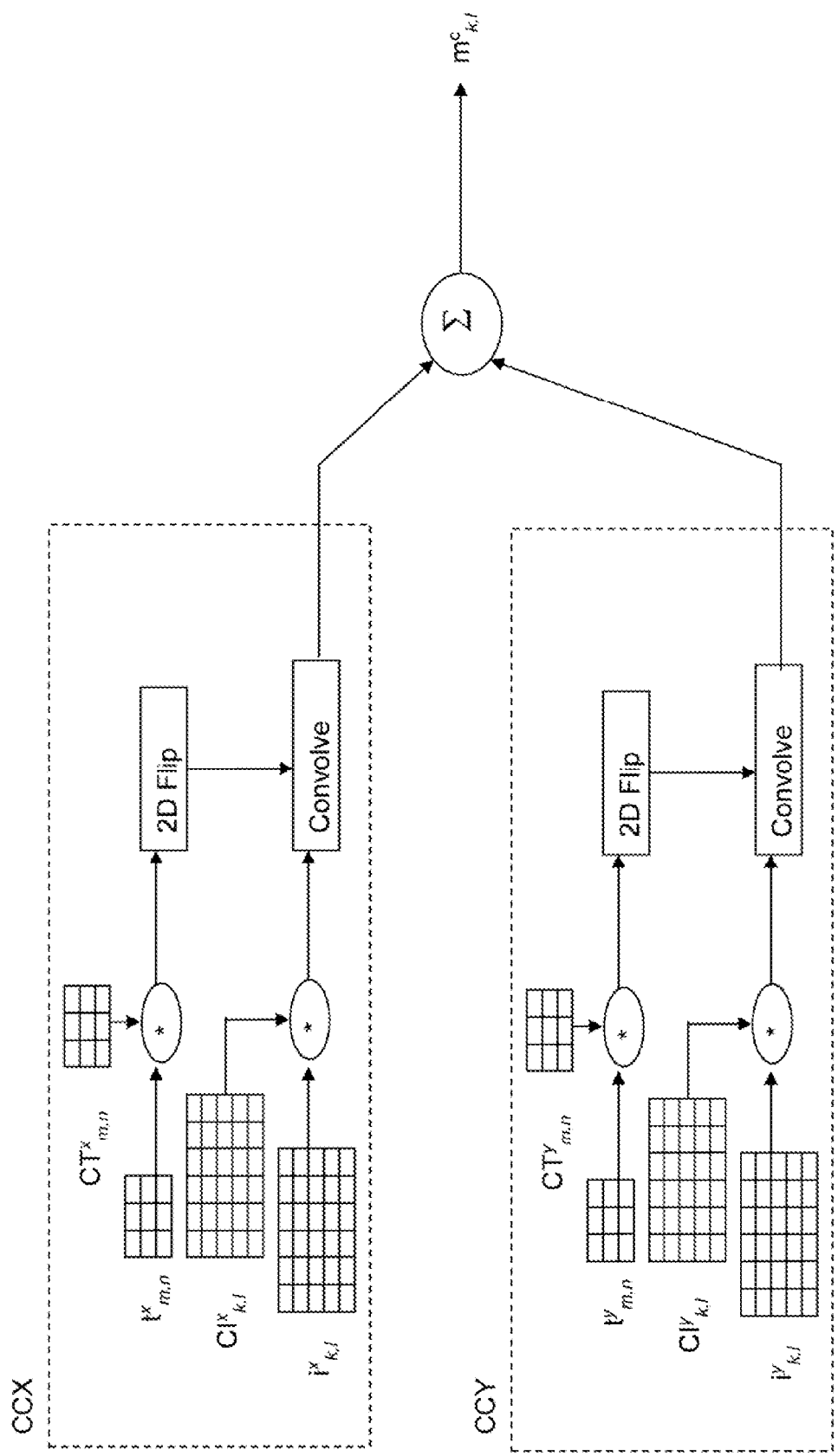
FIG. 7 shows schematically a method of generating a match metric in accordance with an embodiment of the present invention.

FIG. 7 shows schematically a method of generating a cross correlation match metric $m^c_{k,l}$ at a position k,l in the image data, in accordance with an embodiment of the invention.

The match metric $m^c_{k,l}$ is based on the cross correlation calculation in accordance with equation 4, which doesn't yet incorporate the image and template confidence data.

$$m^c_{k,l} = \sum_m \sum_n \langle t_{m,n}, i_{k+m,l+n} \rangle \qquad (4)$$

The computation of the match metric $m_{k,l}^c$ over the image, in accordance with equation 4, can be broken into the sum of two convolution operations: CCX is the convolution of the 2D-flipped x axis template orientation field component $(t_{m,n}^x)^f$ with the x axis image orientation field component $i_{m,n}^x$ and CCY is the convolution of the 2D-flipped y axis template field component $(t_{m,n}^y)^f$ with the y axis image field component $i_{m,n}^y$.

The operators of equation 4, namely the inner product and the two norm of difference can be generalised to a kernel K(a,b), as defined in equation 5.

$$m_{k,l} = \sum_m \sum_n K(t_{m,n}, i_{k+m,l+n}) \qquad (5)$$

Image confidence data $CI_{m,n}$ and template confidence data $CT_{m,n}$, which may otherwise be referred to as an image confidence map and a template confidence map, are introduced into equation 5 to improve the match metric, as defined in equation 6.

$$m^{cf}_{k,l} = \sum_m \sum_n CT_{m,n} \cdot CI_{k,l} \cdot K(t_{m,n}, i_{k+m,l+n}) \qquad (6)$$

Thus, CCX becomes a convolution of $(t_{m,n}^x \cdot CT_{m,n}^x)^f$ and $(i_{k,l}^x \cdot CI_{k,l}^x)$, and CCY becomes a convolution of $(t_{m,n}^y \cdot CT_{m,n}^y)^f$ and $(i_{k,l}^y \cdot CI_{k,l}^y)$.

Calculation of the product of the image confidence data $CI_{k,l}$, either for the x axis or the y axis, and the image orientation field, either for the x axis or the y axis, respectively, involves applying the image confidence data to the image orientation field to generate the element-wise product. The element-wise product may otherwise be referred to as a modified image orientation field $MI_{k,l}$ (including $MI^x_{k,l}$ for the x axis and $MI^y_{k,l}$ for the y axis) which indicates both an orientation of each of the plurality of image features and a likelihood that at least one part of the image orientation field represents at least part of the target object.

Calculation of the element-wise product of the template confidence data $CT_{m,n}$, either for the x axis or the y axis, and the template orientation field, either for the x axis or the y axis, respectively, involves applying the template confidence data to the template orientation field to generate the element-wise product. The element-wise product may otherwise be referred to as a modified template orientation field $MT_{m,n}$ ($MT^x_{m,n}$ for the x axis and $MT^y_{m,n}$ for the y axis) which indicates both an orientation of each of the plurality of features of the template object and a likelihood that at least one part of the template orientation field represents at least part of the target object.

The 2D flipping converts the convolution operation into correlation that is required for template matching. The operation comprises a flip along the x-axis followed by a flip along the y-axis or vice-versa.

The advantage of breaking down the computation of the match metric into convolution operations is that fast optimised convolution implementations already exist in both software libraries and hardware and only minimal change to these implementations is required.

Figure 8:
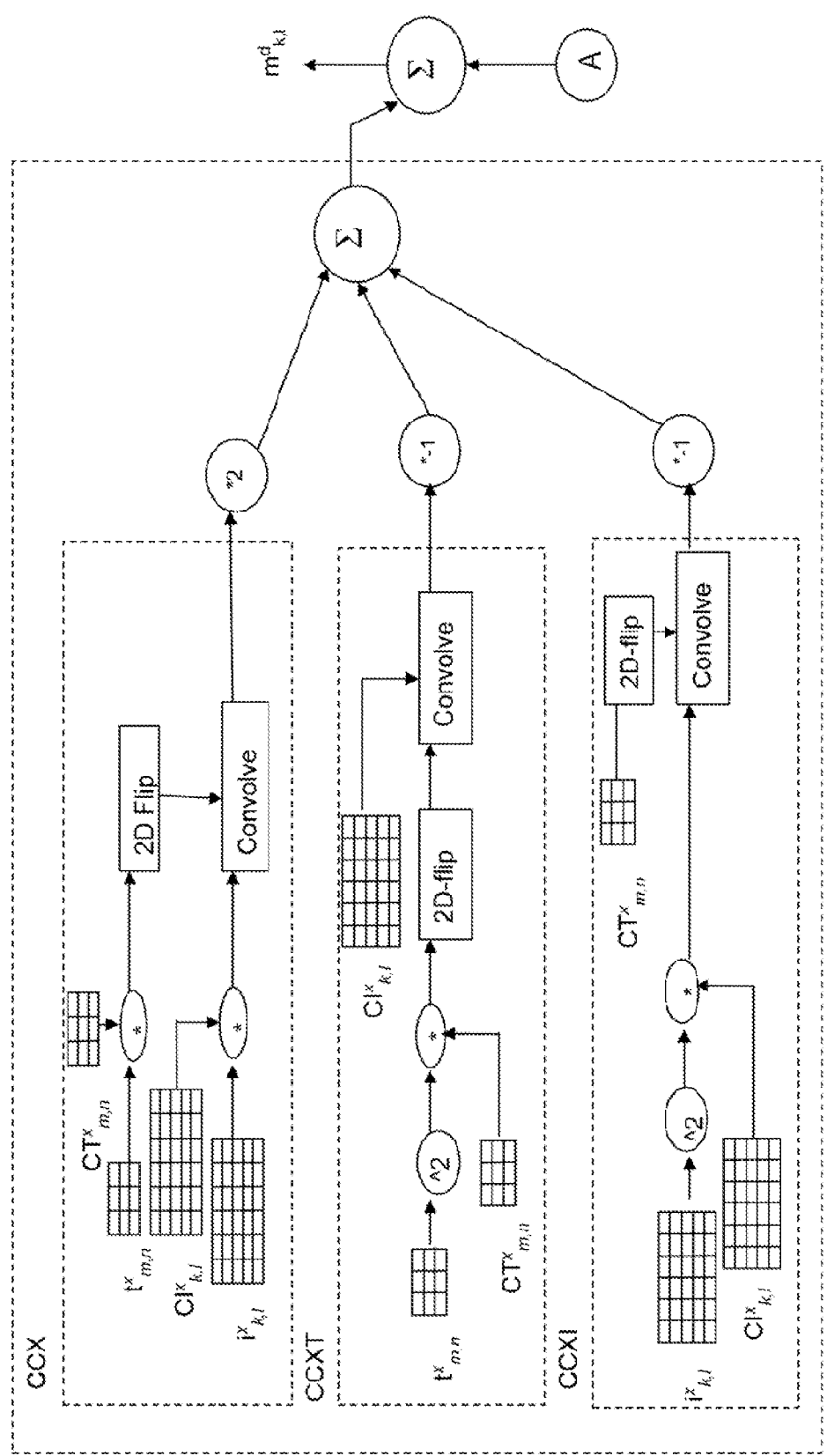
FIG. 8 shows schematically a method of generating a match metric in accordance with a different embodiment of the present invention.
Figure 8:
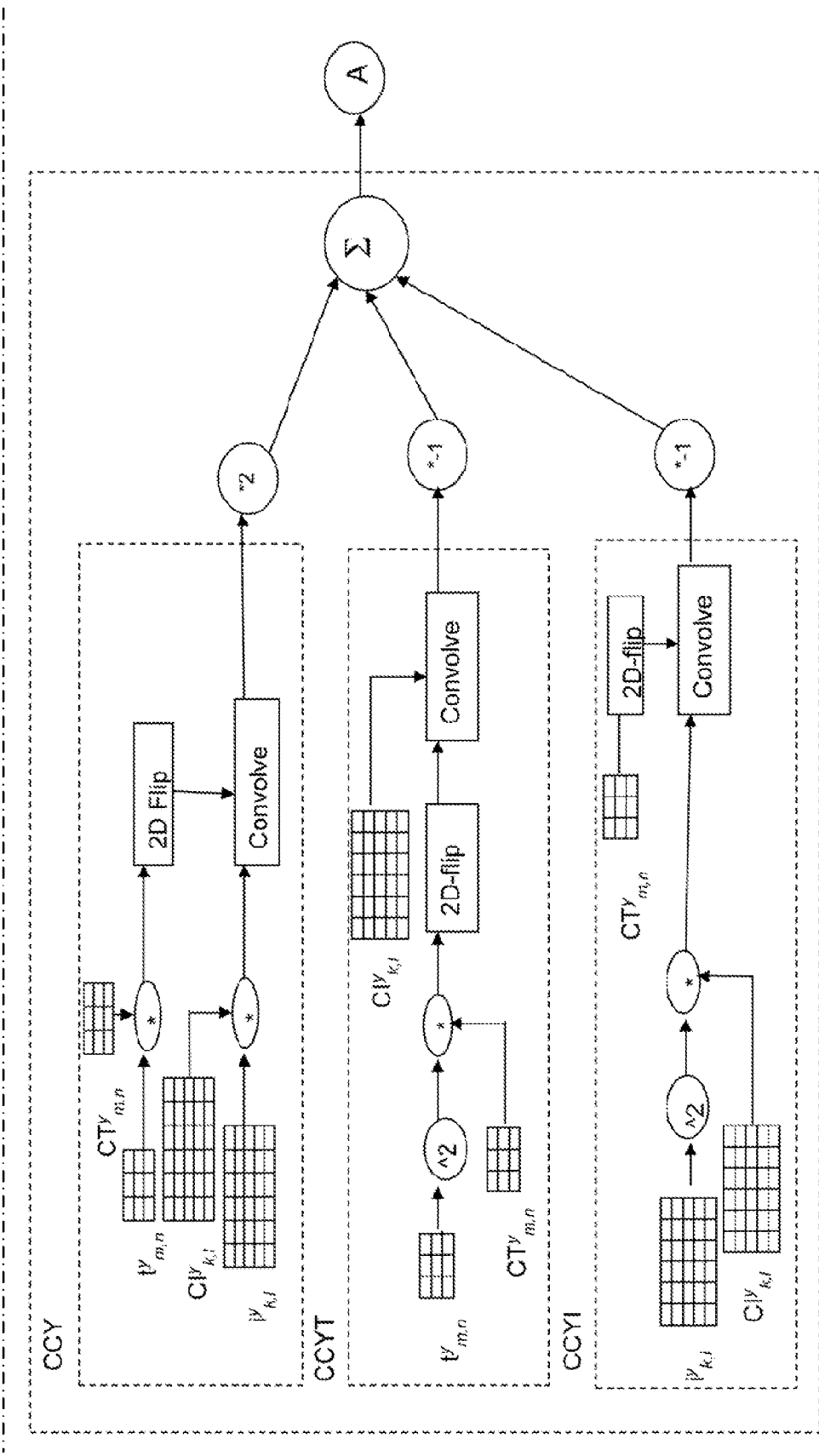

FIG. 8 shows schematically a method of generating a Euclidean distance based match metric $m^d_{k,l}$ at a position in the image data, as an alternative to generating the cross correlation match metric described using FIG. 7, in accordance with a different embodiment of the present invention.

The cross-correlation match metric described using FIG. 7 can give high values to undesired image orientation field neighbourhoods containing relatively longer vectors than the template for unnormalised orientation fields or vectors whose lengths approach unity for normalised orientation fields.

The Euclidean distance based match metric $m^d_{k,l}$ is more selective to matching of the template data by using a negated Euclidean Distance, which only gives a zero value match metric when the template and the image orientation field neighbourhoods are exactly the same. Otherwise the Euclidean distance based match metric $m^d_{k,l}$ produces negative values. The Euclidean distance based match metric $m^d_{k,l}$, without incorporation of the image and template confidence data, is defined in accordance with equation 7.

$$m^d_{k,l} = \sum_m \sum_n -\|t_{m,n} - i_{k-m,l-n}\|^2 \quad (7)$$

$$\|t_{m,n} - i_{k+m,l-n}\|^2 = (t^x_{m,n} - i^x_{k+m,l+n})^2 + (t^y_{m,n} - i^y_{k+m,l+n})^2 \quad (8)$$

The computation of the match metric $m^d_{k,l}$ over the whole image involves a non-linear inner kernel, defined in equation 8, that can be broken down into the sum of two series of linear convolutions, $m^d = CDX + CDY$, where CDX and CDY can be obtained by the addition of two convolution operations each to CCX and CCY.

CDX is defined in accordance with equation 9 and CDY is defined in accordance with equation 10.

$$CDX = 2CCX - CCXT - CCXI \quad (9)$$

$$CDY = 2CCY - CCYT - CCYI \quad (10)$$

With reference to equations 5 and 6, the Euclidean distance based match metric can be generalised to a kernel K(a,b). Image confidence data $CI_{m,n}$ and template confidence data $CT_{m,n}$, are introduced into equation 5 to improve the match metric such that:

CCX becomes a convolution of $(t_{m,n}^x \cdot CT_{m,n}^x)^f$ and $(i_{k,l}^x \cdot CI_{k,l}^x)$, and CCY becomes a convolution of $(t_{m,n}^y \cdot CT_{m,n}^y)^f$ and $(i_{k,l}^y \cdot CI_{k,l}^y)$.

CCXT becomes a convolution of the x axis image confidence data $CI^x_{k,l}$ and the 2D flipped element-wise product of the x axis template confidence data $CT^x_{m,n}$ and the element-wise squared x axis template orientation field $(t^x_{m,n})^2$. CCXI becomes a convolution of the 2D flipped x axis template confidence data $(CT^x_{m,n})^f$ and the element-wise product of the x axis image confidence data $CI^x_{k,l}$ and the element-wise squared x axis image orientation field $(i^x_{k,l})^2$. Namely, CCXT is a convolution of $((t_{m,n}^x)^2 \cdot CT_{m,n}^x)^f$ and $CI_{k,l}^x$ and CCXI is a convolution of $((i_{k,l}^x)^2 \cdot CI_{k,l}^x)$ and $(CT_{m,n}^x)^f$.

CCYT becomes a convolution of the y axis image confidence data $CI^y_{k,l}$ and the 2D flipped element-wise product of the y axis template confidence data $CT^y_{m,n}$ and the element-wise squared y axis template orientation field $(t^y_{m,n})^2$. CCYI becomes a convolution of the 2D flipped y axis template confidence data $(CT^y_{m,n})^f$ and the element-wise product of the y axis image confidence data $CI^y_{k,l}$ and the element-wise squared y axis image orientation field $(i^y_{m,n})^2$. Namely, CCYT is a convolution of $((t_{m,n}^y)^2 \cdot CT_{m,n}^y)^f$ and $CI_{k,l}^y$, and CCYI is a convolution of $((i_{k,l}^y)^2 \cdot CI_{k,l}^y)$ and $(CT_{m,n}^y)^f$.

When generating the Euclidean distance based match metric without image confidence data, the x axis or y axis image confidence data $CI^x_{k,l}$, $CI^y_{k,l}$ is set to a default value of 1. The described convolution operations involving image confidence data use values of 0 outside of the bounds (in other words valid grid values) of the input masks. Since summation functions described above can use coordinates k+m and l+n that are outside the bounds of the input masks, values of 0 are used for these coordinates, in accordance with a boundary handling technique.

Similarly, generating the Euclidean distance based match metric without template confidence data, the x axis or y axis template confidence data $CT^x_{m,n}$, $CT^y_{m,n}$ is set to a default value of 1.

In accordance with a further embodiment of the present invention, the Euclidean distance match metric $m^d_{k,l}$ may be modified to obtain an alternative match metric $m^e_{k,l}$, by using the template phase map $t^p_{m,n}$ and the image phase map $i^p_{k,l}$ generated as described above.

$$abs(t_{m,n}^p - i_{k+m,l+n}) \cdot abs(\cos(a^t_{m,n} - a^i_{k+m,l+n})) = D_{m,n}^{k,l} \quad (11)$$

Using equation 11, the absolute value of the phase difference between the template phase map $t^p_{m,n}$ and a portion of the image phase map $i^p_{k+m,l+n}$, centred on a location with coordinates k,l, is multiplied by the absolute value of the cosine of the difference between the template angle $a^t_{m,n}$ of each feature of the template orientation field and the image angle $a^i_{k+m,l+n}$ of each feature of a portion of the image orientation field, to determine deformation data $D_{m,n}^{k,l}$. If an angle of a feature of the portion of the image orientation field is the same as the corresponding angle of a feature of the template data, the cosine of the difference of the orientation angles equals 1, and thus this uses the entire value of the displacement provided by the difference of the template and image phase at the location of the feature. If, however, a template and an image angle are perpendicular to each other, the deformation cannot be resolved and there is no contribution of the displacement at the location of this feature to the match metric.

The deformation data $D_{m,n}^{k,l}$ is in this embodiment a matrix including a plurality of scalar deformation values, each value corresponding with the matching of one of the features of the template data at coordinate m,n to a feature from a portion of the image data centred at coordinate k,l. Each deformation value corresponds with a phase difference between the template data and a portion of the image data. The deformation data is indicative of a deformation of the template with respect to the image data. Larger deformation values may indicate a greater deformation to fit the template data to the portion of the image data, and vice versa. Such deformation values may be considered to represent a mismatch between the template data and the portion of the image data. The magnitude of the value indicates the extent of the mismatch.

The deformation data $D_{m,n}^{k,l}$ described so far relates to matching template data to image data of a still image. The deformation data may also be applied to video image data. Accordingly, deformation data $D_{k,l}$ may be determined for a series of image frames of video image data, and a mismatch between the image data from consecutive frames may be used to indicate motion of a feature at coordinate k,l in the video image data.

In this embodiment, and using a similar method as that described using FIG. 8, a modified Euclidean distance match metric $m^e_{k,l}$ is generated using the deformation data $D_{m,n}^{k,l}$. Accordingly, the non-linear inner kernel described m,n above with reference to FIG. 8 is modified to equation 12:

$$m^e_{k,l} = m^d_{k,l} - \sum_m \sum_n (D_{m,n}^{k,l})^2. \quad (12)$$

In the non-linear inner kernel of equation 12, the sum of the square of each scalar value of the deformation data $D_{m,n}^{k,l}$ matrix is subtracted from the distance match metric $m^d_{k,l}$ to determine the modified Euclidean distance match metric $m^e_{k,l}$. Thus, the calculated match metric $m^e_{k,l}$ advantageously takes into account any deformation between the template data and the image data, to allow a target object to be identified in the image data more accurately. The deformation data $D_{m,n}^{k,l}$ therefore provides for deformable or warping matching of a template with image data, rather than being limited to rigid matching. In particular, use of the deformation data $D_{m,n}^{k,l}$ provides for improved identification of a target object when phase characteristics of the target object are known. For example, if a target object is sought in image data representing a line drawing, the known phase characteristics can allow the system to be made more responsive to line drawings than to solid objects.

Identification of Target Object

One of the match metrics described above may be computed for each vector of the matrix of the image data, as determined by the matrix coordinates, or for each vector value of a region of interest (ROI) which is determined in the image data by a user of by a computer vision algorithm.

In order to determine whether the target object has been identified in the image data, each value of the calculated match metric is thresholded by a threshold value that can be set by a user or by a different object detector. For example, if one of the calculated match metrics has a value greater than the threshold, then it is determined that the target object has been identified in the image, with the centre of the target object being represented by that match metric value. If, however, the match metric value is lower than the threshold, then that match metric does not identify the target object.

Use of the image and/or template confidence data influences the values of the calculated match metrics, such that, in this example, the value of the match metric is increased where the corresponding part of the image has a relatively high likelihood of including the target object, as indicated by the confidence data. Further, the value of the match metric is decreased for parts of the image having a relatively low likelihood of including the target object. In this way the confidence data improves identification of the target object in the image.

The above embodiments are to be understood as illustrative examples of the invention. Further embodiments of the invention are envisaged. For example, further characteristics of the target object may be used to generate the image confidence data. Also, further known parameters of the target object may be used to generate template confidence data.

In further embodiments of the present invention, one of the image confidence data and the template confidence data may not be used to generate the match metric. For example, only template confidence data may be used, or only image confidence data may be used.

The determination of an orientation field using a training image being a mean human face image has been described above. In alternative embodiments, an orientation field may be determined for each of a plurality of different training images representing, for example, different human faces, and a mean orientation field may be generated from the plurality of determined orientation fields.

The template and/or image phase map may be used to provide certainty data based upon detecting patterns of deformation. For example, higher deformation values localised to a region of image data compared with other regions of the image data during the matching of a template to a portion of the image data may be used to indicate occlusion of a target object in the image data.

Examples of image processing methods have been described, including methods for generating image orientation fields and template orientation fields methods for generating a match metric. Further image processing methods, known in the art, may be applied in the method of the present invention, either additionally, or alternatively, to those described. Further, the image data of any of the embodiments described may include video image data. In such an embodiment, the method of the present invention may, for example, be utilised to provide a focus of attention operator.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of identifying a target object in an image including a plurality of image features, wherein said method includes:
   a) storing template data, said template data representing a template orientation field indicative of an orientation of each of a plurality of features of a template object;
   b) receiving image data representing said image;
   c) processing said image data to generate an image orientation field indicating an orientation corresponding to said plurality of image features;
   d) processing said image data to generate image confidence data based on at least one characteristic for use in identifying said target object in a given image, said characteristic being indicative of an increased likelihood that at least one part of said given image represents at least part of said target object, relative to other parts of said given image;
   e) applying said image confidence data to said image orientation field to generate a modified image orientation field indicating both an orientation corresponding to said plurality of image features and a likelihood that at least one part of said image orientation field represents at least part of said target object; then
   f) processing said modified image orientation field using said template orientation field to generate a match metric indicative of an extent of matching between at least part of said template orientation field and at least part of said image orientation field; and
   g) using said match metric to determine whether or not said target object has been identified in said image.

2. A method according to claim 1, wherein said characteristic indicated by said image confidence data relates to an extent of image data errors expected in said image data and said method includes using said image confidence data to generate said match metric in accordance with said expected extent of image data errors.

3. A method according to claim 1, wherein said characteristic indicated by said image confidence data relates to a possible occlusion of part of the target object in the image and said method includes using said image confidence data to generate said match metric in accordance with said possible occlusion.

4. A method according to claim 1, wherein
   said image data is video image data and wherein optionally said characteristic relates to a possible movement of the target object.

5. A method according to claim 4, wherein with said characteristic relating to a possible movement of the target object said method includes using an identified movement of said target object to determine a modified shape of said target object which is modified from a shape of said target object represented by said template data.

6. A method according to claim 1, wherein
   said image data represents said image in colour and said characteristic relates to at least one colour indicative of said target object.

7. A method according to claim 1, including generating the match metric using deformation data indicative of a deformation of template data with respect to image data.

8. A method according to claim 1, wherein at least one of said image data, said template data, said image confidence data, and deformation data used to generate the match metric, is arranged according to a matrix format.

9. A method according to claim 1, wherein each of said image features represents, in said image, a boundary which separates a region of higher light intensity from a region of lower light intensity.

10. A method according to claim 9, wherein said boundary separates two regions, each having a similar light intensity, from each other.

11. Apparatus comprising:
 at least one processor;
 and at least one memory including computer program instructions;
the at least one memory and the computer program instructions being configured to, with the at least one processor, cause the apparatus at least to perform the method of claim 1.

12. A computer program product comprising a non-transitory computer-readable storage medium having computer readable instructions stored thereon, the computer readable instructions being executable by a computerised device to cause the computerised device to perform the method according to claim 1.

13. A method of identifying a target object in an image including a plurality of image features, wherein said method includes:
 a) storing template data, said template data representing a template orientation field indicative of an orientation of each of a plurality of features of a template object;
 b) receiving template confidence data indicating a likelihood that at least one part of said template accurately represents at least part of said target object;
 c) receiving image data representing said image;
 d) processing said image data to generate an image orientation field indicating an orientation corresponding to said plurality of image features;
 e) applying said template confidence data to said template orientation field to generate a modified template orientation field indicating both an orientation of each of said plurality of features of said template object and a likelihood that at least one part of said template orientation field represents at least part of said target object; then
 f) processing said image orientation field using said modified template orientation field to generate a match metric indicative of an extent of matching between at least part of said template orientation field and at least part of said image orientation field; and
 g) using said match metric to determine whether or not said target object has been identified in said image.

14. A method according to claim 13, including generating the match metric using deformation data indicative of a deformation of template data with respect to image data.

15. A method according to claim 13, wherein each of said image features represents, in said image, a boundary which separates a region of higher light intensity from a region of lower light intensity.

16. A method according to claim 15, wherein said boundary separates two regions, each having a similar light intensity, from each other.

17. Apparatus comprising:
 at least one processor;
 and at least one memory including computer program instructions;
the at least one memory and the computer program instructions being configured to, with the at least one processor, cause the apparatus at least to perform the method of claim 13.

18. A computer program product comprising a non-transitory computer-readable storage medium having computer readable instructions stored thereon, the computer readable instructions being executable by a computerised device to cause the computerised device to perform the method according to claim 13.

* * * * *